United States Patent
Tonga

(10) Patent No.: US 8,043,084 B2
(45) Date of Patent: Oct. 25, 2011

(54) DEVICE FOR MOULDING CONTAINERS COMPRISING MEANS OF ADJUSTING THE VOLUME DIMENSIONS OF THE MOULDING CAVITY

(75) Inventor: Jules Tonga, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 287 days.

(21) Appl. No.: 12/426,487

(22) Filed: Apr. 20, 2009

(65) Prior Publication Data

US 2009/0263535 A1 Oct. 22, 2009

(30) Foreign Application Priority Data

Apr. 21, 2008 (FR) ..................... 08 52663

(51) Int. Cl.
*B29C 49/48* (2006.01)
(52) U.S. Cl. ........ 425/195; 249/102; 249/111; 249/155; 425/522; 425/526
(58) Field of Classification Search ............ 425/182, 425/195, 522, 526; 249/102, 111, 155
See application file for complete search history.

(56) References Cited

U.S. PATENT DOCUMENTS

| | | | |
|---|---|---|---|
| 5,411,391 A | 5/1995 | Albrecht et al. | |
| 5,968,560 A | 10/1999 | Briere et al. | |
| 6,428,302 B1 * | 8/2002 | Tsau | 425/192 R |
| 6,733,272 B1 | 5/2004 | Derouault et al. | |
| 6,948,924 B2 * | 9/2005 | Tsau et al. | 425/195 |
| 2004/0013762 A1 | 1/2004 | Bianchini | |
| 2004/0202746 A1 | 10/2004 | Tsau et al. | |
| 2009/0232929 A1 * | 9/2009 | Blochmann et al. | 425/522 |
| 2010/0203186 A1 * | 8/2010 | Tsau et al. | 425/526 |

FOREIGN PATENT DOCUMENTS

| | | |
|---|---|---|
| EP | 0 565 916 A1 | 10/1993 |
| FR | 2 646 802 A1 | 11/1990 |
| FR | 2 790 703 A1 | 9/2000 |
| FR | 2 813 231 A1 | 3/2002 |

OTHER PUBLICATIONS

French Preliminary Search Report for FR 0852663 dated Dec. 18, 2008.

* cited by examiner

*Primary Examiner* — Robert B Davis
(74) *Attorney, Agent, or Firm* — Sughrue Mion, PLLC

(57) ABSTRACT

Device for moulding containers, in particular bottles, from a thermoplastic material such as PET by blow-moulding or stretch blow-moulding of heated preforms, such moulding device comprising at least one mould comprising at least two mould halves respectively comprising two supports and two mould blocks defining a joint plane in the closed position of the mould, each mould block comprising a shell) in which an impression is made partly forming the moulding cavity and a shell-holder fixed to said respective support of the mould block, characterised in that at least one removable spacer is provided between said shell and said shell-holder, as a result of which the dimensional characteristics of the moulding cavity can be modified without the need for intervention on the supports and the shell-holders.

11 Claims, 4 Drawing Sheets

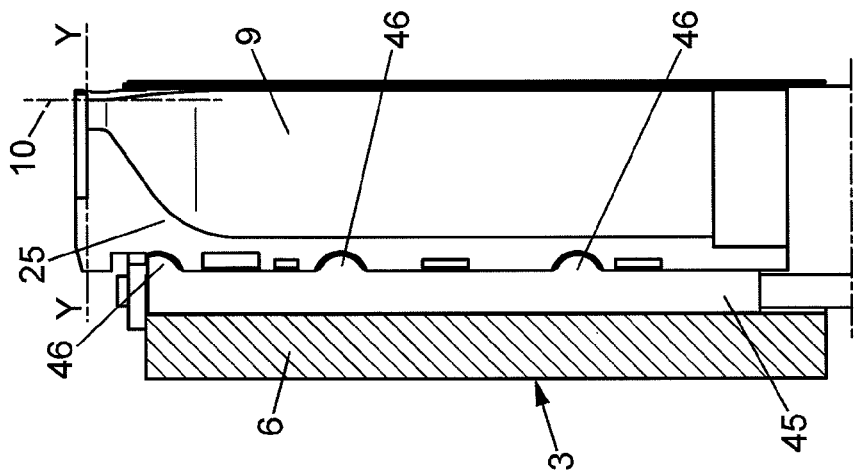
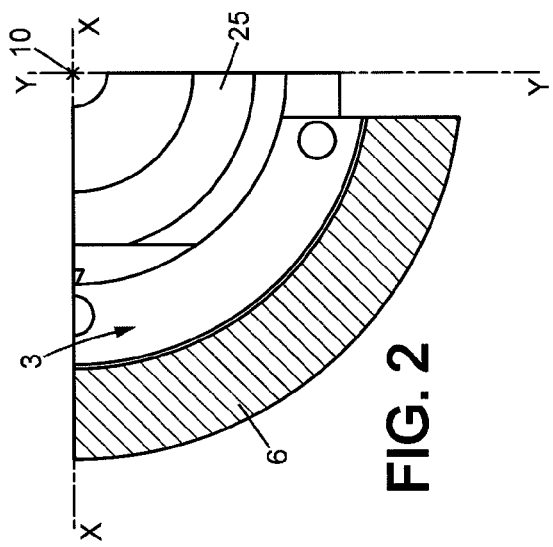
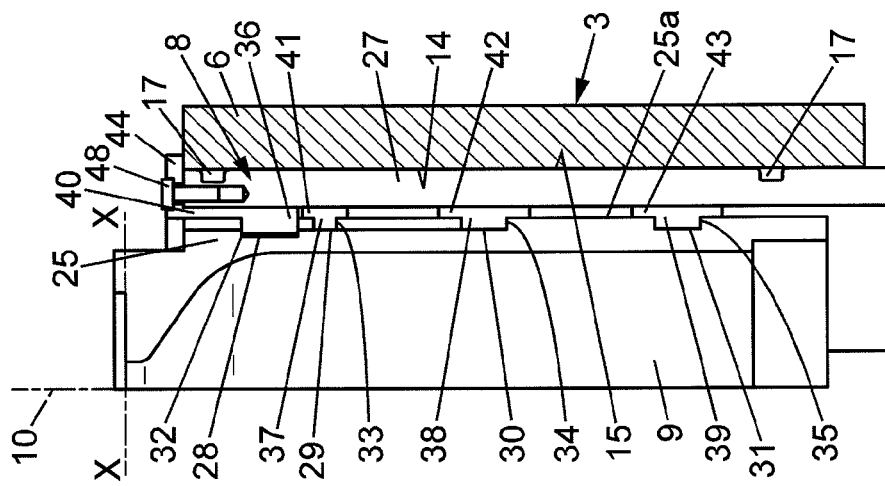

DEVICE FOR MOULDING CONTAINERS COMPRISING MEANS OF ADJUSTING THE VOLUME DIMENSIONS OF THE MOULDING CAVITY

FIELD OF THE INVENTION

The present invention generally relates to the field of moulding containers, in particular bottles, from a thermoplastic material such as PET (polyethylene terephthalate) by blow-moulding or stretch blow-moulding of heated preforms.

More particularly, the invention relates to improvements made to devices for moulding containers, in particular bottles, from a thermoplastic material such as PET by blow-moulding or stretch blow-moulding of heated performs, which moulding devices comprise at least one mould comprising at least two mould halves respectively comprising two supports and two mould blocks defining a joint plane in the closed position of the mould.

DESCRIPTION OF THE PRIOR ART

A moulding device of the type to which the invention applies is shown diagrammatically in FIG. 1 of the attached drawings.

The moulding device, identified as a whole as 1, comprises, in the configuration shown, two mould halves 2 and 3 respectively capable of forming the shoulder, body and bottom of the containers as a whole; in another possible configuration, the mould can comprise three elements, that is two mould halves 2 and 3 to form the shoulder and body of the containers and a vertically mobile mould bottom to form the bottom of the containers.

In the example shown, the mould 1 is made up of two mould halves 2, 3, which are rotatably articulated relative to each other around a pin 4 (book mould); however, it must be understood that the invention does not apply solely to this type of mould and can be applied to other types of mould, in particular moulds in which the mould halves are linearly mobile.

The two mould halves 2, 3 comprise two supports 5, 6 respectively and two mould blocks 7, 8 respectively supported by the former. In the example shown, the cross-section of the mould blocks 7, 8 has an approximately elliptical general shape. Two respective moulding impressions are hollowed out in the two mould blocks 7, 8 and together form a moulding cavity 9 with an axis 10. The two mould blocks 7, 8 have cooperating surfaces or bearing surfaces 11 and 12 respectively that, in a closed blowing position of the mould, rest against each other along a joint plane P.

The supports 5, 6 are arranged in such a way as to have, on one side (that is, the side of the hinge pin 4 of the two mould halves 2, 3), respective protruding lugs (not shown but of a type known per se) spaced apart from each other, to which are connected activation means (opening-closing) that can have any appropriate configuration (also not shown but of a type known per se) and, on the opposite side, means of locking in the closed position identified as a whole as 13, which can also have any appropriate configuration. Such activation means and such locking means are in particular described in document FR 2 863 930 and document FR 2 659 265.

One of the two mould halves (here the mould half 3, located on the left in FIG. 1) is arranged so that a sealed chamber 18 known as the "compensation chamber" is defined between the respective assembly surfaces 14, 15 of its support 6 and its mould block 8 by a seal 16 (housed in a groove 17 made for example in the assembly surface 15 of the mould block 8) and so that said mould block 8 can be moved relative to the support 6 approximately perpendicularly to its bearing surface 12.

The wall of the support 6 of the mould half 3 containing the sealed chamber 18 is pierced by a through channel 19 that opens into the compensation chamber 18. The channel 19 is connected (not shown in the figures) to a high-pressure fluid source. In a practical manner, the channel 19 can be connected to the blowing fluid source and, in this case, provision is made for the projection of the surface of the compensation chamber 18 on the joint plane P to be greater than the surface of the projection of the moulding cavity 9 on said joint plane P. During blowing, under the action of the pressure in the compensation chamber 18, the mould block 8 is pushed back towards the facing mould block 7 and its bearing surface 12 is pressed hard against the bearing surface 11 of the mould block 7.

Once blowing is complete, to ensure that the mould block 8 returns to its retracted position at the bottom of the respective support 6, provision is made for the mould block 8 to be supported by the respective support 6 by means of elastic return means 20. A simple solution shown in FIG. 1 consists of, to form each elastic return means 20, an elastic return component 21 being placed between the head of a tie rod 22 in the form of a bolting component and the external surface 23 of the support 6.

For its part, the mould block 7 (located on the right in FIG. 1) is supported in a fixed manner by the respective support 5.

A mould arranged as described above with reference to FIG. 1 of the attached drawings is disclosed in document FR 2 659 265 (FIG. 1 of the attached drawings is taken from FIG. 1 of that document), which can be referred to for more comprehensive explanations.

In addition, in the type of mould to which the invention more particularly applies, each mould block 7, 8 comprises a shell 24, 25 in which is formed the impression partly forming the moulding cavity 9 and a shell-holder 26, 27 fixed to the respective support 5, 6 of the mould block 7, 8.

However, when the user of such a moulding device wishes to change his production line of blow-moulded containers, in particular by modifying the dimensional characteristics of the containers, he has to modify the mould block shells, and sometimes even the mould block supports as well, because the dimensional characteristics of the shells can be different depending on the production line and/or the dimensions of the moulding cavity.

It would therefore be particularly advantageous to produce a moulding device allowing for the easy fitting of any type of shell to a single mould block support.

SUMMARY OF THE INVENTION

To this end, the present invention relates to a device for moulding containers, in particular bottles, made from a thermoplastic material such as PET by blow-moulding or stretch blow-moulding of heated preforms, such moulding device comprising at least one mould comprising at least two mould halves respectively comprising two supports and two mould blocks defining a joint plane in the closed position of the mould, each mould block comprising a shell in which an impression partly forming the moulding cavity is made and a shell-holder fixed to said respective mould block support, characterised in that the device comprises means of modifying the dimensional characteristics of the moulding cavity, said modification means comprising at least one removable spacer provided between said shell and said shell-holder.

Advantageously, the modification means are capable of modifying the moulding cavity without the need for intervention on the supports and the shell-holders.

Advantageously, the removal spacer is a radial spacer so that when the spacer is mounted between said shell and said shell-holder, the radial dimension of the cavity is reduced.

Advantageously, the shell comprises an external surface in which is formed at least one groove that is partly complementary to said at least one spacer.

According to an advantageous embodiment, said at least one spacer comprises a protruding part capable of being housed by complementarity in a groove in the external surface of the shell, together with a part forming an interface between said shell and said shell-holder.

Advantageously, said part forming an interface has an approximately constant thickness.

Advantageously, said at least one spacer extends approximately on the periphery the shell.

According to an advantageous embodiment, said at least one spacer is at least partly annular.

Advantageously, said at least one spacer comprises a part extending approximately radially fixed to one end of the shell-holder.

Still according to an advantageous embodiment, the moulding device according to the invention comprises at least one longitudinal spacer fixed to a shell of a mould half and capable of resting against the shell-holder of the other mould half when the two mould halves are closed against each other.

Advantageously, the longitudinal spacer comprises at least one protrusion capable of being housed by complementarity in at least one groove made in the external surface of the shell.

Advantageously, said at least one spacer is fixed to the shell and/or the shell-holder using means of screwing.

BRIEF DESCRIPTION OF THE DRAWINGS

The present invention will now be described using examples for illustration only that in no way limit the scope of the invention and are based on the following drawings, in which:

FIG. 2 is a partial top view of a mould half of a moulding device according to the invention;

FIG. 3 is a partial axial cross-section along the axis X-X of a mould half of a moulding device according to the invention;

FIG. 4 is an axial cross-section along the axis Y-Y of a mould half of a moulding device according to the invention;

DETAILED DESCRIPTION OF THE INVENTION

For the sake of consistency, the same components have the same reference numbers throughout the description of the figures.

Figure 1:
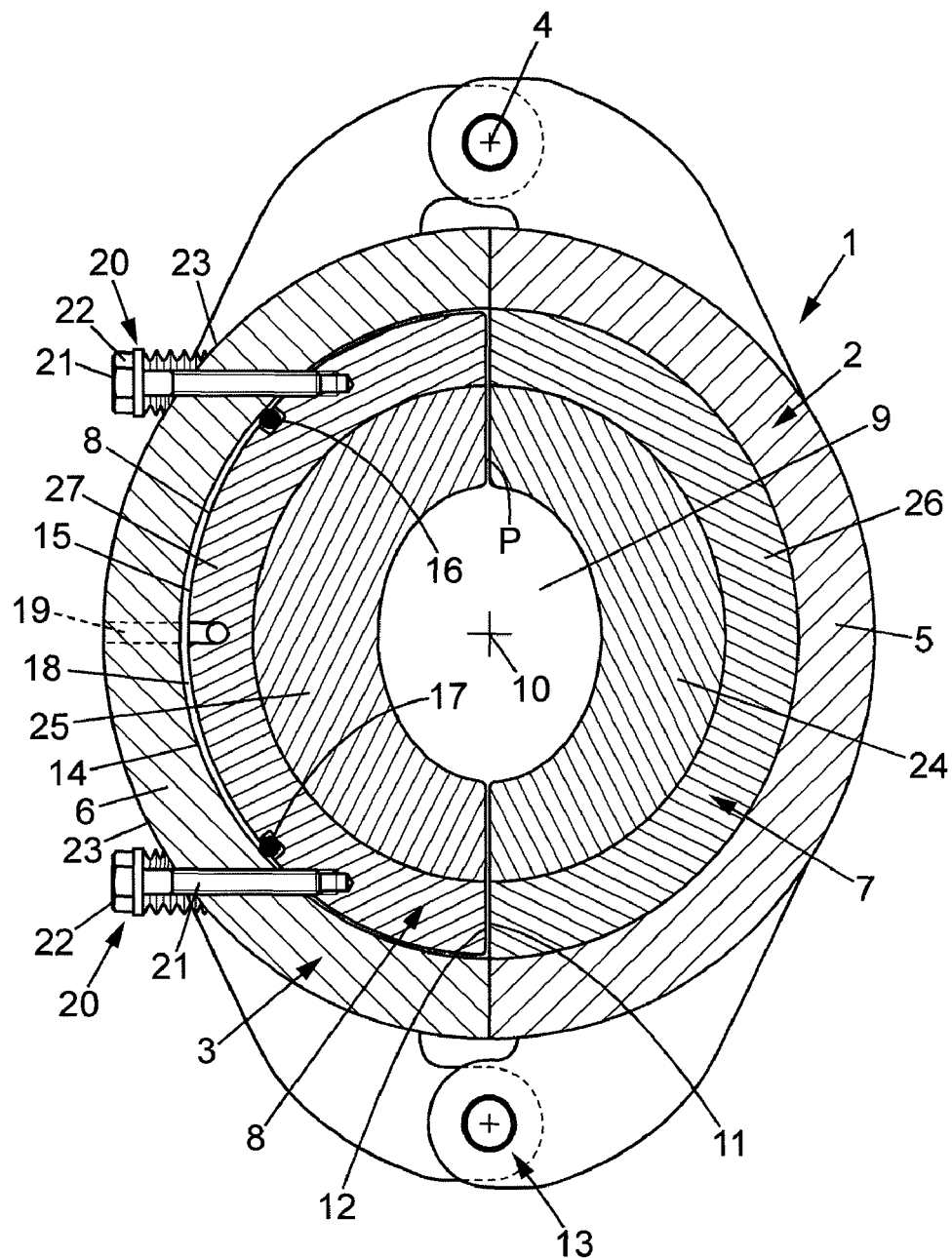
FIG. 1 is a diagrammatic transverse cross-section of a moulding device according to the prior art.
Figure 7:
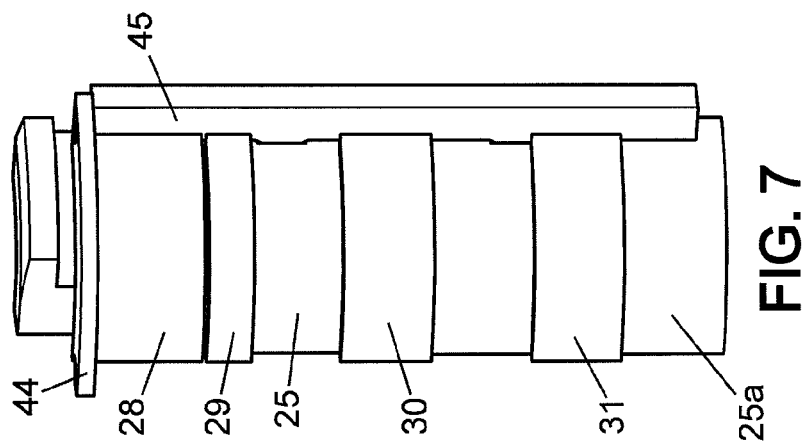
FIG. 7 is a partial perspective view of the external surface of the shell to which are fixed the spacing means according to the invention.
Figure 6:
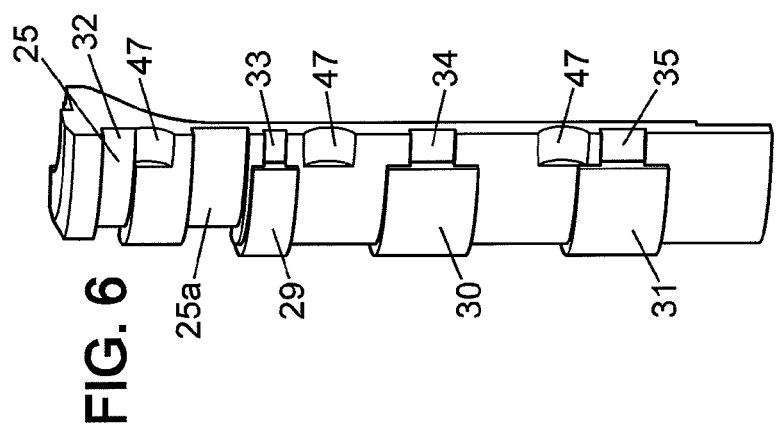
FIG. 6 is a partial perspective view of the external surface of the shell to which are fixed part of the spacing means between the shell and the shell-holder according to the invention.
Figure 5:
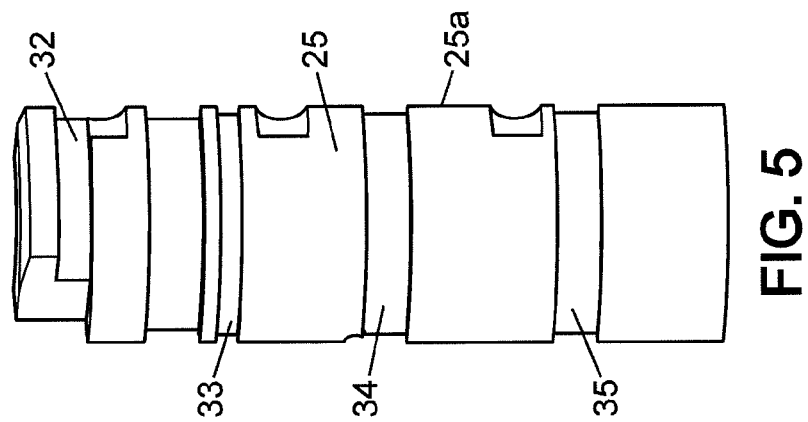
FIG. 5 is a partial perspective view of the external surface of the shell according to the invention.

Moreover, it must be noted that the general provisions of the invention apply equally to a moulding device with a compensation chamber 18 as described in FIG. 1, but can also apply to any type of moulding device without such a chamber 18.

In addition, although the invention is described with reference to generally semi-circular or elliptical mould halves 2, 3, it must be understood that the invention applies to mould halves 2, 3 of any type of shape (for example rectangular).

FIG. 2 shows a partial top view of a mould half 3, that is, a half of a mould half 3, whilst FIGS. 3 and 4 respectively show axial cross-sections along the axes X-X and Y-Y of the mould half 3.

Generally, the present invention relates to a device for moulding containers, in particular bottles, from a thermoplastic material such as PET by blow-moulding or stretch blow-moulding of heated preforms, such moulding device comprising at least one mould 1 comprising at least two mould halves 2, 3 respectively comprising two supports 5, 6 and two mould blocks 7, 8 defining a joint plane P in the closed position of the mould, each mould block 7, 8 comprising a shell 24, 25 in which an impression is made partly forming the moulding cavity 9 and a shell-holder 26, 27 fixed to the respective support 5, 6 of the mould block 7, 8.

FIG. 3 shows the presence of at least one removable spacer 28, 29, 30, 31 between the shell 25 and the shell-holder 27, as a result of which the dimensional characteristics of the moulding cavity 9 can be modified without the need for intervention on the support 5 and the shell-holder 27.

It must be understood that, although only the presence of a spacer between the shell 25 and the shell-holder 27 is shown and described in the figures, at least one spacer is also provided in a similar manner between the shell 24 and the shell-holder 26.

In order to enable the cooperation of the spacer 28, 29, 30, 31 with the shell 25, provision is made for at least one groove 32, 33, 34, 35 with a partly complementary shape to said at least one spacer 28, 29, 30, 31 to be formed in the external surface 25a of the shell 25 (that is, the surface opposite the surface of the shell 25 partly forming the moulding cavity 9).

Figure 8:
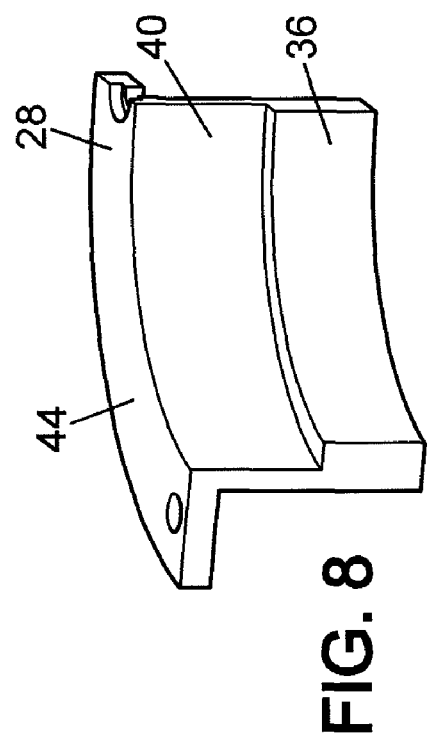
FIG. 8 is a partial perspective view of an embodiment of a spacer between the shell and the shell-holder according to the invention.

According to the embodiment of the invention shown in the figures, a first spacer 28 is provided, shown in greater detail in perspective view in FIG. 8, capable of being secured by partial complementarity in a groove 32 provided on the external surface 25a of the shell 25. A second spacer 29, a third spacer 30 and a fourth spacer 31 are also provided, all respectively capable of being secured by partial complementarity in a groove 33, 34, 35 formed in the external surface 25a of the shell 25.

Generally, each spacer 28, 29, 30, 31 respectively comprises a protruding part 36, 37, 38, 39 capable of being housed by complementarity in a groove 32, 33, 34, 35 of the external surface 25a of the shell 25, together with a part 40, 41, 42, 43 forming an interface between the shell 25 and the shell-holder 27, the part 40, 41, 42, 43 forming an interface having an approximately constant thickness.

Preferably, the spacer 28, 29, 30, 31 extends approximately on the periphery around the shell 25 and/or is at least partially annular.

The first spacer 28, as shown in FIG. 8, comprises a part 44 extending approximately radially and capable of being fixed to one end of the shell-holder 27.

Additionally, a longitudinal spacer 45 is provided, fixed to a shell 25 of a mould half 3 and capable of resting against the shell-holder 26 of the other mould half 2 when the two mould halves 2, 3 are closed against each other. To this end, the longitudinal spacer 45 comprises at least one protrusion 46 capable of being housed by complementarity in at least one groove 47 made in the external surface 25a of the shell 25.

Figure 9:
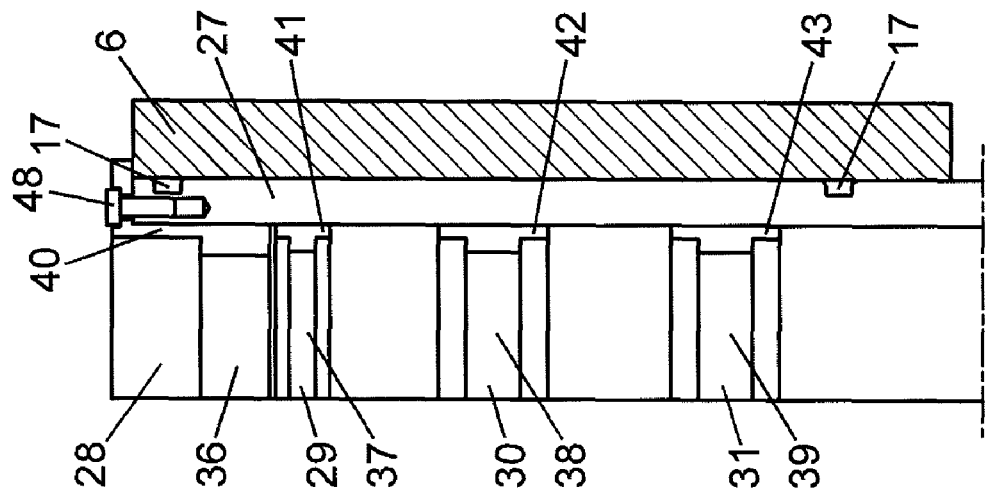
FIG. 9 is a partial perspective view of a mould half before the fixing of the shell to the spacing means according to the invention.

Furthermore, it must be noted that the spacers 28, 29, 30, 31, 45 are fixed to the shell 25 and/or the shell-holder 27 using means of screwing 48 (see FIG. 9 for the means of screwing 47 the first spacer 28 to the shell-holder 27).

Thus, according to the invention, it is possible to modify the shells 24, 25 of the mould halves 2, 3 quickly and simply by adding or removing the spacers 28, 29, 30, 31 fixed removably to the shell-holder 26, 27.

What is claimed is:

1. Device for moulding containers, in particular bottles, from a thermoplastic material such as PET by blow-moulding or stretch blow-moulding of heated preforms, such moulding device comprising at least one mould comprising at least two mould halves respectively comprising two supports and two mould blocks defining a joint plane in the closed position of the mould, each mould block comprising a shell in which an impression is made partly forming the moulding cavity and a shell-holder fixed to the respective support of the mould block, and a mechanism that modifies the dimensional characteristics of the moulding cavity comprising at least one removable spacer provided between said shell and said shell-holder wherein the removal spacer is a radial spacer so that when the spacer is mounted between said shell and said shell-holder, the radial dimension of the cavity is reduced.

2. Device according to claim 1, wherein said shell comprises an external surface in which is formed at least one groove with a shape at least partly complementary to said at least one spacer.

3. Device according to claim 1, wherein said at least one spacer comprises a protruding part capable of being housed by complementarity in a groove of the external surface of the shell as well as a part forming an interface between said shell and said shell-holder.

4. Device according to claim 3, wherein said part forming an interface has an approximately constant thickness.

5. Device according to claim 1, wherein said at least one spacer extends approximately on the periphery said shell.

6. Device according to claim 1, wherein said at least one spacer is at least partly annular.

7. Device according to claim 1, wherein said at least one spacer comprises a part extending approximately radially and fixed to one end of said shell-holder.

8. Device according to claim 1, wherein it comprises at least one longitudinal spacer fixed to a shell of a mould half and capable of resting against said shell-holder of the other mould half when the two mould halves are closed against each other.

9. Device according to claim 8, wherein said longitudinal spacer comprises at least one protrusion capable of being housed by complementarity in at least one groove made in the external surface of said shell.

10. Device according to claim 1, wherein that said at least one spacer is fixed to said shell and said shell-holder using means of screwing.

11. Device according to claim 1, wherein that said at least one spacer is fixed to said shell or said shell-holder using means of screwing.

* * * * *